No. 833,774. PATENTED OCT. 23, 1906.
F. L. CLARK.
CONVEYER.
APPLICATION FILED AUG. 3, 1898.

7 SHEETS—SHEET 2.

WITNESSES:
Chas. F. Miller
W. S. Doolittle

INVENTOR,
Francis L. Clark,
by T. J. Hogan,
Att'y.

No. 833,774. PATENTED OCT. 23, 1906.
F. L. CLARK.
CONVEYER.
APPLICATION FILED AUG. 3, 1898.
7 SHEETS—SHEET 3.
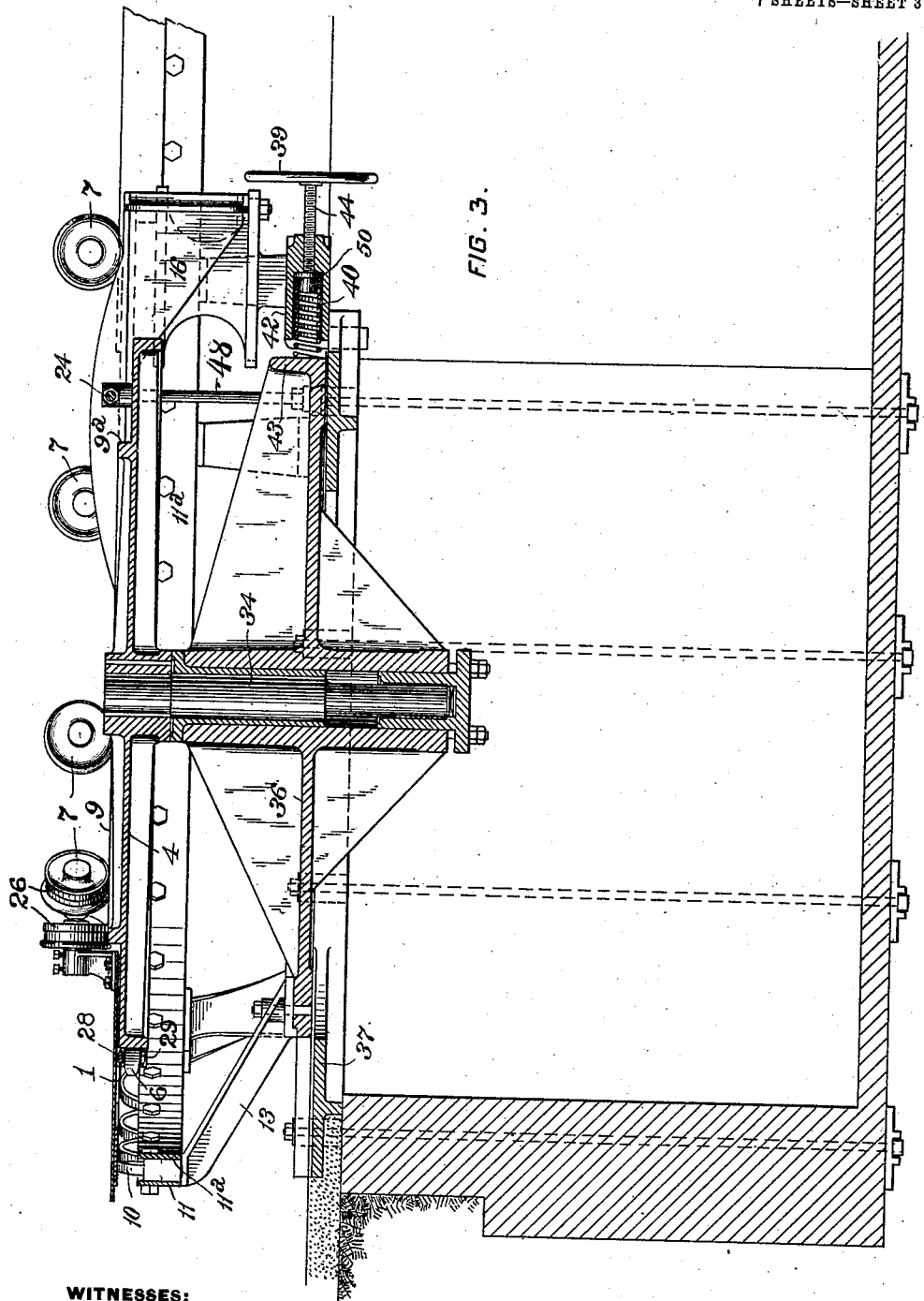
WITNESSES:
INVENTOR,

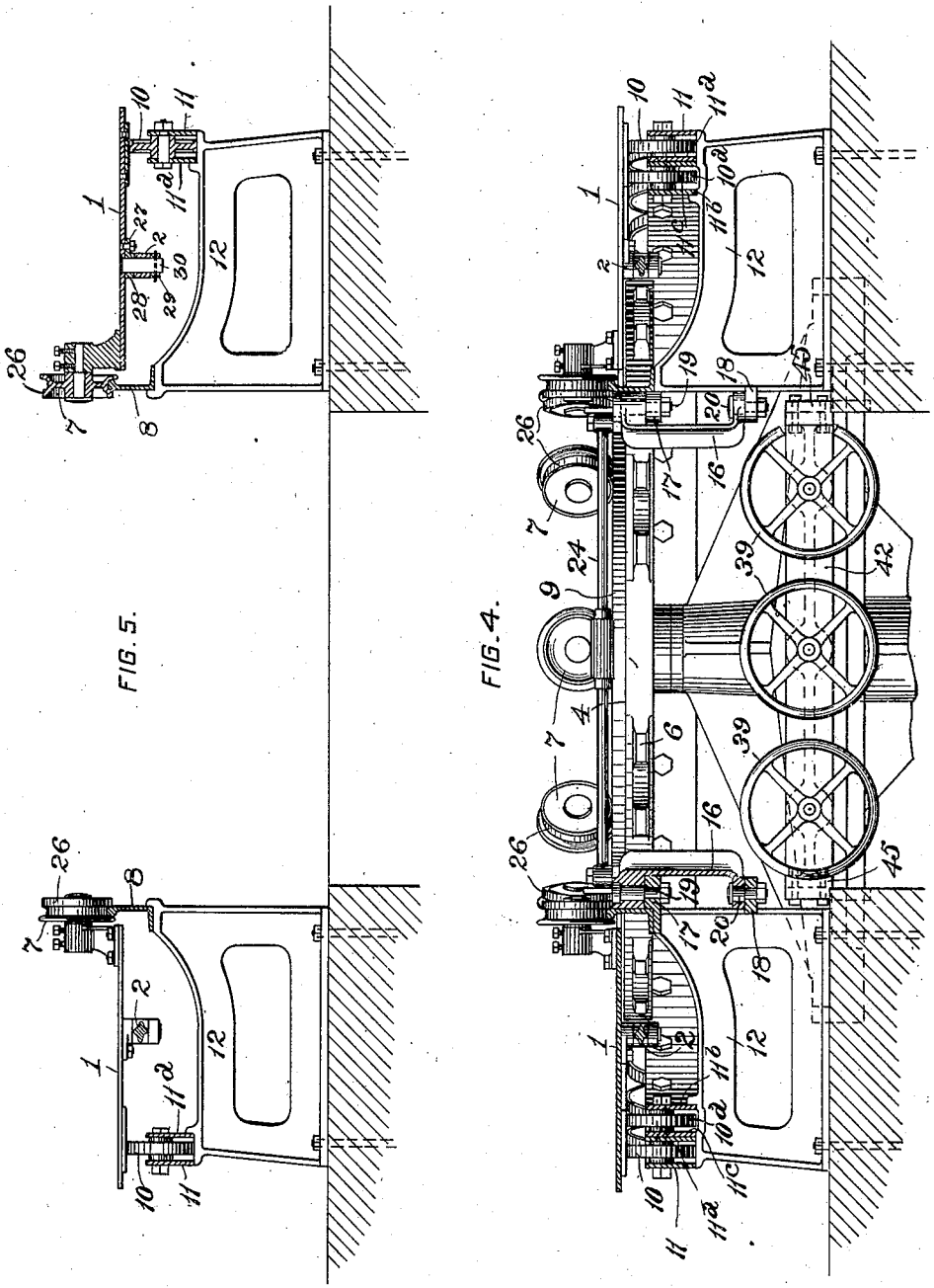

No. 833,774. PATENTED OCT. 23, 1906.
F. L. CLARK.
CONVEYER.
APPLICATION FILED AUG. 3, 1898.
7 SHEETS—SHEET 5.
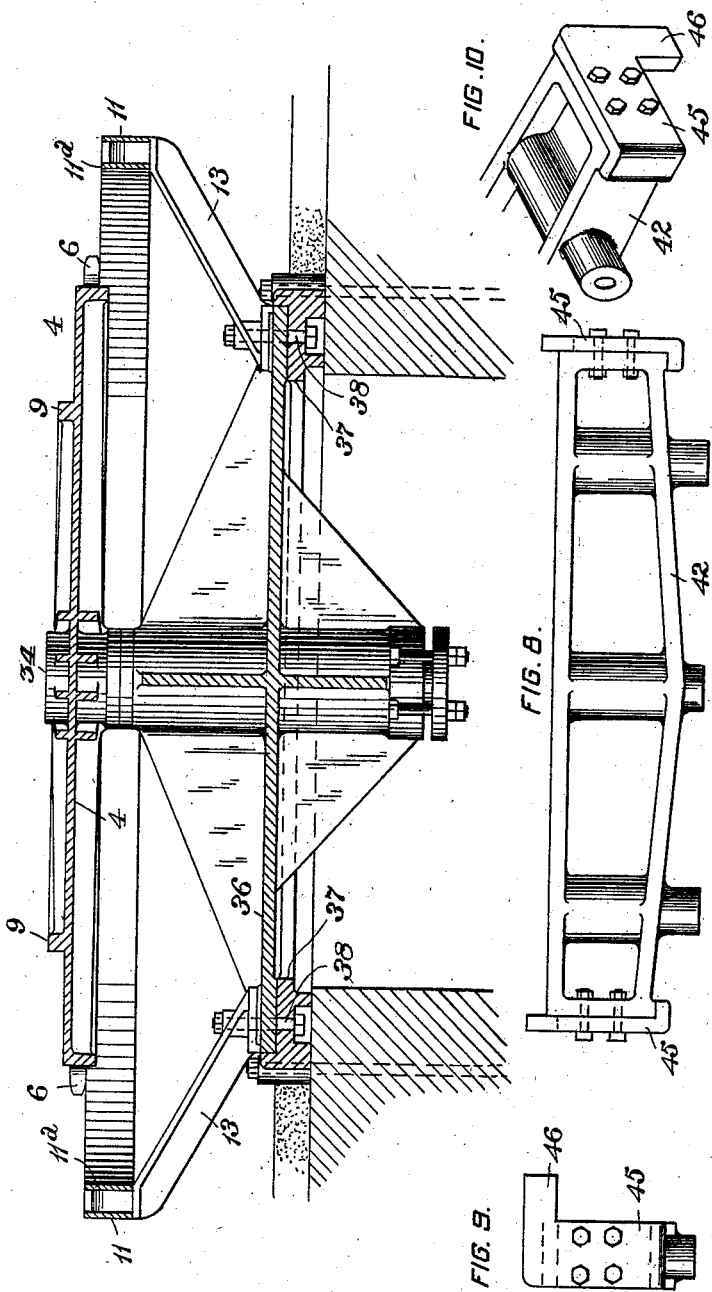
WITNESSES:
INVENTOR,
Francis L. Clark,
by T. J. Hogan,
Att'y.
THE NORRIS PETERS CO., WASHINGTON, D.C.

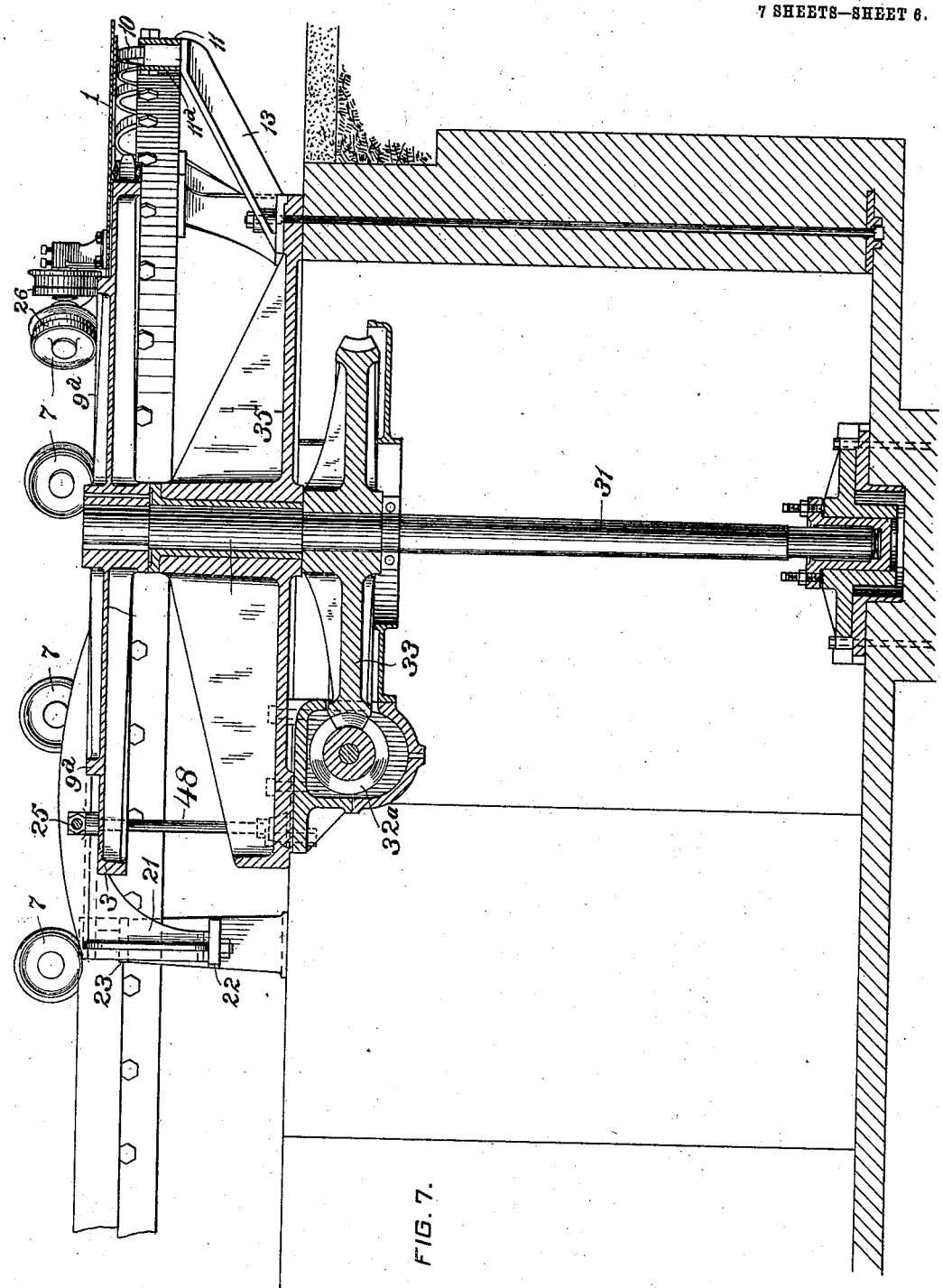

No. 833,774.
PATENTED OCT. 23, 1906.
F. L. CLARK.
CONVEYER.
APPLICATION FILED AUG. 3, 1898.
7 SHEETS—SHEET 7.
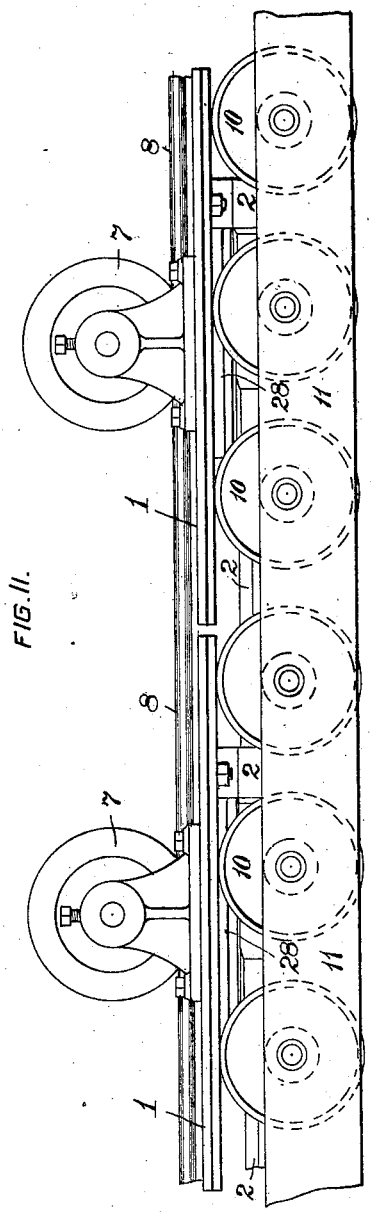
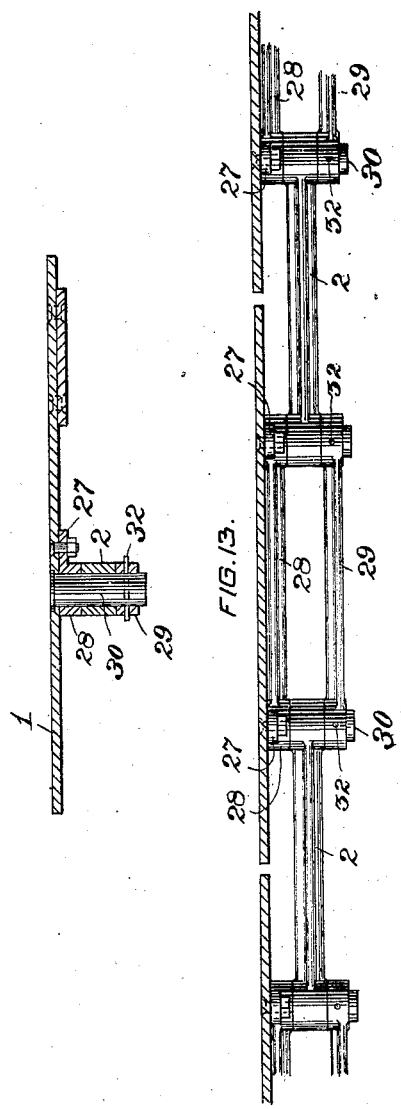
WITNESSES:
Chas. F. Miller.
INVENTOR,
Francis L. Clark,
by T. J. Hogan,
Att'y.
THE NORRIS PETERS CO., WASHINGTON, D. C.

UNITED STATES PATENT OFFICE.

FRANCIS L. CLARK, OF PITTSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

CONVEYER.

No. 833,774.  Specification of Letters Patent.  Patented Oct. 23, 1906.

Application filed August 3, 1898. Serial No. 687,584.

*To all whom it may concern:*

Be it known that I, FRANCIS L. CLARK, a citizen of the United States, residing at Pittsburg, in the county of Allegheny and State of Pennsylvania, have invented or discovered a certain new and useful Improvement in Conveyers, of which improvement the following is a specification.

The object of my invention is to provide an improvement in conveyers; and to this end my invention consists in a new and improved endless conveyer in which a number of movable platforms, tables, or cars are employed for moving packages, boxes, or other articles.

Figure 1:
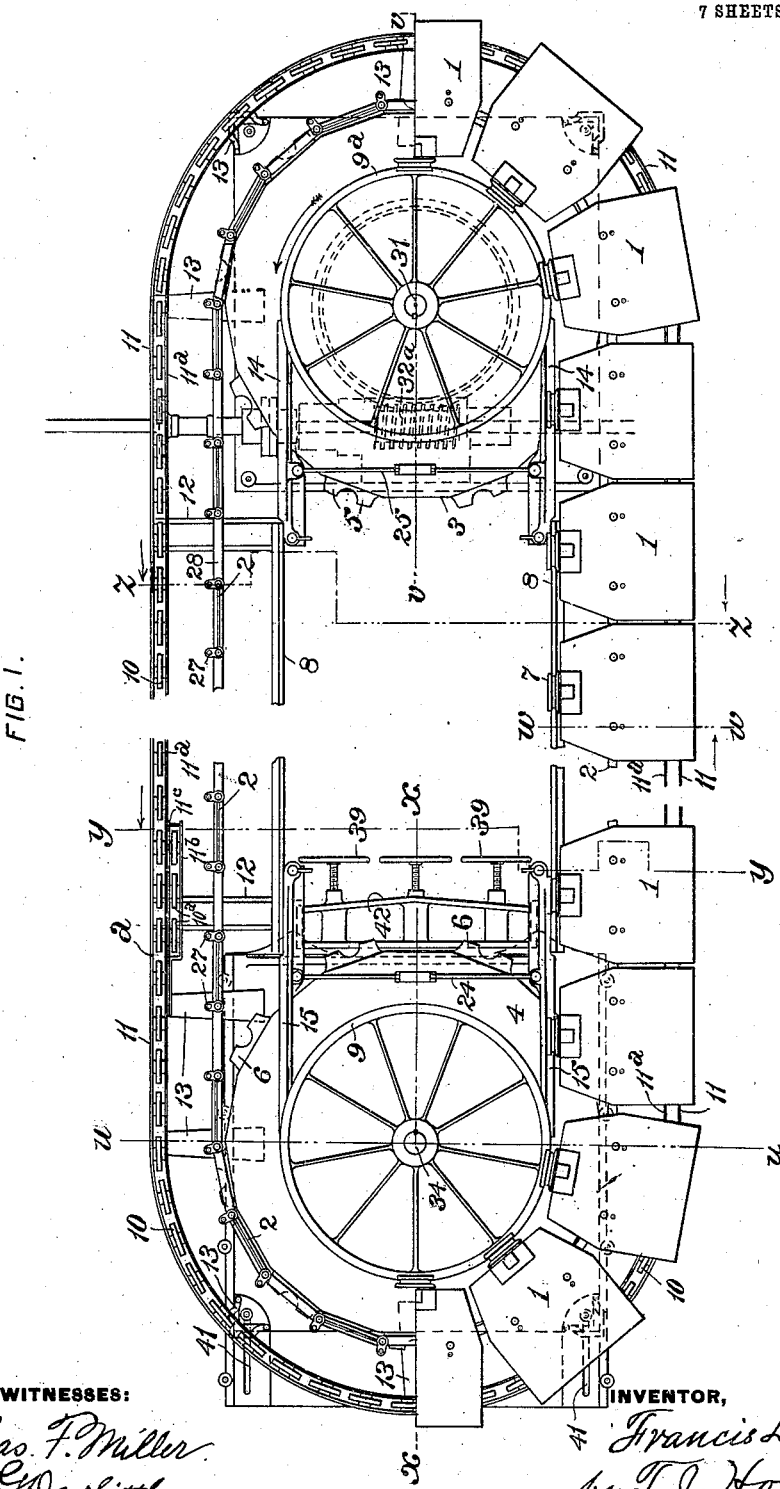
Figure 2:
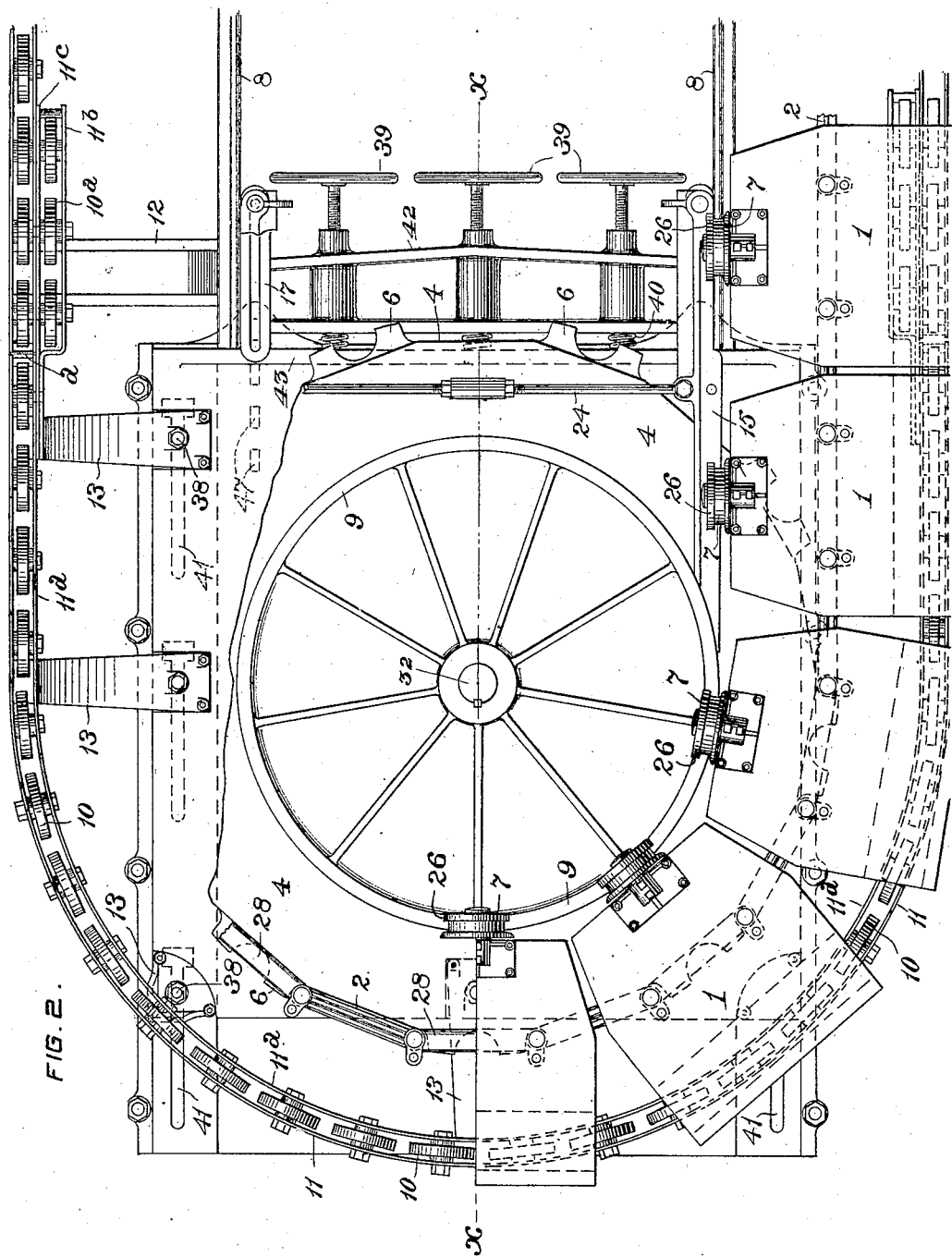

In the accompanying drawings, which illustrate an application of my invention, Figure 1 is a plan view of my improved conveyer with the platforms removed from one-half of the structure; Fig. 2, a similar view, on a larger scale, of one end of the conveyer; Fig. 3, a vertical sectional view on the line $x\ x$ of Figs. 1 and 2; Fig. 4, a vertical section on the line $y\ y$ of Fig. 1; Fig. 5, a vertical section on the line $z\ z$ of Fig. 1; Fig. 6, a vertical section through the framing of the conveyer and through the adjustable sprocket-wheel on the line $u\ u$ of Fig. 1; Fig. 7, a vertical section on the line $v\ v$ of Fig. 1; Figs. 8, 9, and 10, views showing in detail a part of the adjusting mechanism; Fig. 11, an enlarged view showing in elevation the platforms and upper and lower supporting-rollers; Fig. 12, a sectional view, on an enlarged scale, through one of the platforms and through the bearing with which the sprockets engage, the section being taken on the line $w\ w$ of Fig. 1 and viewed from the left; Fig. 13, a sectional view through the platforms at right angles to that of Fig. 12, the sprocket-bearings and connecting-links being shown in elevation.

As shown in the drawings, the conveyer comprises a number of horizontal platforms 1, which are connected together by links 2 and which are moved by the rotation of the sprocket-wheels 3 and 4. The wheel 3 acts as the driver, and the wheel 4 and the platforms are driven thereby, the sprockets 5 and 6 of the wheels 3 and 4, respectively, engaging with the sprocket-bearings under the platforms.

In accordance with my invention the platforms are supported at or near their inner edges by wheels or rollers 7 of peculiar construction, which are adapted to roll on a straight rail 8 between the ends of the conveyer and which at the ends of the conveyer are carried around the turning-point on circular rails or flanges 9 and $9^a$ in such a manner that there is no rotation of the roller—that is, it does not roll on the circular rails.

The outer edges of the platforms are supported on and move over wheels or rollers 10, mounted on a frame composed of two plates 11 and $11^a$, which are rigidly secured to cross-frames 12 between the ends of the conveyer and which at the curved end portions are rigidly secured to and supported by the brackets 13. The inner rails 8 are also secured to and supported by the cross-frames 12, and these cross-frames rest on and may be fixed to any suitable foundation, so that the plates 11 and $11^a$ and the rollers 10 may be supported at any desired height above the ground or floor. This is an important feature in many cases—as, for example, where the conveyer is employed in a foundry the floor of which is covered with sand.

The outer rollers 10 form a train of rollers which are not connected with the platforms and which may be sufficiently close together to form any desired number of supporting-points for the outer portions of each of the platforms. The outer portions of the platforms merely rest on the rollers 10 without being connected thereto and slide over the rollers with little or no friction. By means of this construction a rigid, durable, and permanent support of any desired strength is provided for the outer portions of the platforms, and as the platforms may be placed quite close together near their outer edges the rollers and their bearings may be so covered by the platforms as to prevent any considerable amount of dust, sand, or dirt from falling on them. The space between the plates 11 and $11^a$ is open at the top and bottom, and any dust, sand, or dirt which may fall from above will drop through to the floor and not be retained in position to interfere with the operation of the rollers. On account of their position and the protection thus afforded the rollers are not liable to become clogged with dirt or to be interfered with by piles of sand or other material which may be on the floor, but will always move with but little friction and with much more ease than if they were attached to the platforms and had to be dragged over the floor and through or over all obstructions thereon.

The employment of the train of rollers on a stationary frame obviates any necessity for securing rollers to the outer portions of the platforms, and the platforms are thereby freed from the weight of the rollers and of the brackets, which would be necessary to secure them in place, and the load to be driven in moving the platforms is correspondingly reduced.

At the ends of the straight rails 8 I provide switch-rails 14 and 15, by which the rollers 7 are carried in their movement between the rails 8 and the circular rails or flanges 9 and 9ª on the sprocket-wheels 3 and 4. The switch-rails 15 are formed integral with or secured to a downwardly-projecting plate 16, which is pivotally secured near its upper and lower edges to the slotted brackets 17 and 18 by means of the bolts 19 and 20, as shown in Figs. 2, 3, and 4, so that the switch-rails may be adjusted longitudinally when the nuts on the lower ends of the bolts are slacked up. A downward extension 21 on each of the switch-rails 14 is pivoted in the brackets 22 and 23 without any provision for adjustment, for the reason that the axis of the sprocket-wheel 3 is fixed at all times and there is no variation in the distance between the ends of the rails 8 and the points of tangency on the wheel 3 at which the ends of the switch-rails 14 touch. The switch-rails 15 are made adjustable, so that they may be shifted when the sprocket-wheel 4 is adjusted to take up the slack of the endless chain to which the platforms are connected. The switch-rails 15 are connected together by an adjustable rod 24 and the switch-rails 14 by a similar rod 25, so that these rails may always be maintained in their proper positions relative to the wheels 3 and 4. The rollers 7 at the inner edges of the platforms 1 are grooved so as to fit the rails 8 and are provided on their inner edges with a flange 26, having a cylindrical surface which is adapted to bear on the switch-rail and on the circular rails 9 and 9ª of the sprocket-wheels. When the rollers 7 are moving on the rails 8, the inner surface of the groove in the roller bears on the rail, and when the roller passes from the rail 8 to the switch-rail, which has a flat upper surface, the cylindrical surface of the flange 26 is in contact with and rolls on the flat surface of the switch-rail, from which it passes to the rail 9 or 9ª on the sprocket-wheel. After it is transferred to the circular rail or flange the roller 7 does not rotate, but is carried around by the wheel, as on a turn-table, without any movement of the roller relative to the sprocket-wheel or circular rail. When the roller passes from the switch-rail to the circular rail at the point of tangency of the switch-rail and the circular rail, the platform takes a position relative to the sprocket-wheels, in which the center line of the platform is radial to the center of the wheel, and as the platforms are carried around this radial position is maintained until the roller passes from the circular rail to the switch-rail. During the time that the rollers are on the circular rail they are supported on the cylindrical flange 26, but a single element of which is in contact with the rail in a radial position. There is therefore no rubbing or rolling of the rollers 7 and no friction or other resistance such as might occur if the platforms were otherwise supported on the wheels.

As shown in Figs. 12 and 13, each of the platforms 1 is rigidly connected to what may be called a "double" link of an endless chain composed of alternate single and double links, the single links 2 forming the connections between platforms. Each of the double links is formed of an upper bar 28 and a lower bar 29, having their ends fitted on pins 30, which pass through the platform and have their heads countersunk therein. The ends of the single links are fitted on the pins 30 between the bars 28 and 29 and form bearing-surfaces of considerable size for the sprockets 5 and 6, which project into the spaces between the bars 28 and 29 as the chain passes around the sprocket-wheels. The bars 28 are provided near the ends with lugs 27, which are bolted to the platforms, and the bars 29 are secured to the pins 30 by smaller pins 32. By means of this construction the double link is firmly secured to the platform and there is no lost motion between the pins and any of the links. The sprocket-wheel 3 is secured to a vertical shaft 31, which is mounted in a fixed frame-plate 35 and driven by a worm-gear 32ª 33, and the sprocket-wheel 4 is secured to a shaft 34, which is mounted in a bearing formed on a movable plate 36, which is adapted to slide on a fixed base-plate 37. The brackets 13, which support the curved portions of the roller-frame, are secured to the movable plates 36, and the plate 36 will not ordinarily be tightly bolted to the fixed base-plate; but if it is and it is desired to adjust the sprocket-wheel 4 to take up the slack the nuts on the bolts 38 are slacked up and the hand-wheels 39 are turned so as to vary the compression of the springs 40. The springs 40 are mounted in cavities formed in a transverse bearing-frame 42, which is hooked into the fixed base-plate 37, and they bear at one end against a flange 43 on the movable plate and at the other end against a block 50, which is in contact with a screw-threaded stem 44. The slots 41 permit movement of the bolts 38 in the base-plate 37. On the ends of the bearing-frame 42 are bolted the straps 45, having downwardly-extending portions 46, adapted to hook into holes 47 in the base-plate, which are shown in dotted lines in Fig. 2. The bearing-frame 42 may be shifted so as to hook the parts 46 into any of the holes 47 as the position of the plate 36 and the compression of the springs 40 may require. The curved portion of the roller-frame extending around the sprocket-wheels at the adjustable end of the conveyer is not integrally connected with the straight portions between the ends, and there is a space between the adjoining ends of the plates 11 and 11ª where the continuity of these plates is interrupted. This space is marked a in Figs. 1 and 2 and is shown on one side only of the drawings, because on the other side the break is covered by the platforms; but in this respect and in all of the construction for permitting adjustment the two sides of the conveyer are alike. In order to prevent too great a separation of the bearing-points of a platform as it passes from the stationary part of the roller-frame to the adjustable part, I provide additional rollers 10ª, mounted between the plates 11ᵇ and 11ᶜ, which overlap the ends of the straight stationary part of the roller-frame and which are secured to the inner plate 11ª of the adjustable portion of the frame, so that when the adjustment is made the rollers 10ª move with the adjustable part and provide a bearing between the two rollers that have been moved apart.

My improvement is not limited to a construction in which the device for supporting the load is a flat platform or table, and, if preferred, boxes or cars of some other form may be employed.

I claim as my invention and desire to secure by Letters Patent—

1. In a conveyer, the combination with a series of connected platforms having wheels or rollers secured thereto, of a track or rail for said wheels, and a horizontal sprocket-wheel having a rail adapted to support the wheels or rollers in their passage around the sprocket-wheel.

2. In a conveyer, the combination, with a series of connected platforms, of a track or rail on which said platforms are movable, and a sprocket-wheel adapted to form a support for one side of the platforms in their passage around the sprocket-wheel.

3. In a conveyer, the combination, of a series of connected platforms, wheels or rollers connected to one side of the platforms, a track or rail on which said wheels are adapted to run, and a sprocket-wheel having a curved track adapted to support the wheels or rollers in their passage around the sprocket-wheel.

4. In a conveyer, the combination, with connected platforms, of rollers connected to and supporting the platforms on one side, a roller-frame, comprising a stationary portion and an adjustable portion with rollers mounted therein for supporting the other side of the platforms.

5. In a conveyer, the combination, with connected platforms, of an inner rail, rollers connected to the platforms, and adapted to roll on the rail, a sprocket-wheel also adapted to support said rollers, an outer frame and rollers mounted in the frame and adapted to form an outer support for the platforms.

6. In a conveyer, the combination, with an endless chain and sprocket-wheels for engaging therewith, of platforms, secured to the chain and supported on one side by wheels, or rollers, secured to the platforms, said rollers being supported, at the ends of the conveyer, by said sprocket-wheels, and a train of wheels or rollers, unconnected with the platforms and forming a support therefor.

7. In a conveyer, the combination, with connected platforms, and means for driving them, of means for supporting one side of the platforms, comprising a train of wheels, or rollers, mounted in a frame having a stationary portion and an adjustable portion.

8. In a conveyer, the combination, with movable platforms, of means for supporting one side of the platforms, comprising a train of wheels, or rollers, mounted in a frame which is formed of a stationary portion and an adjustable portion overlapping the stationary portion and wheels or rollers mounted in the overlapping part of the adjustable portion of the frame.

9. In a conveyer, the combination with movable platforms, of sprocket-wheels and a straight track or rail on which the platforms are supported when moving between sprocket-wheels, a circular track on which the platforms are supported in passing around a sprocket-wheel, and a switch-rail between the straight track and the circular track.

10. In a conveyer, the combination, with movable platforms, of an adjustable sprocket-wheel, a track or rail on which the platforms are supported, and an adjustable switch-rail between the track and the sprocket-wheel.

11. In a conveyer, the combination with movable platforms, each having vertical pins secured to the bottom thereof, of two bars secured at each end to the pins, and connecting bars or links for securing the platforms together.

12. In a conveyer, the combination, with movable platforms, and sprocket-wheels, of a sprocket-chain having a double link formed of an upper bar having lugs which are rigidly secured to the platform, pins passing through the platform and upper bar, a lower bar fitted on the pins and secured thereto, and a connecting-link fitted to each pin between the upper and lower bars, and adapted to form a bearing for the sprockets, or teeth, of the sprocket-wheels.

13. In a conveyer, the combination, with movable platforms, and a sprocket-wheel having a circular track or rail, a support on which the outer portions of the platforms are adapted to move freely, and a single wheel or roller, for supporting the inner portion of each platform and which is carried around with the wheel without rotation on its axis, whereby the center lines of the platforms are maintained in a radial position relative to the wheel.

In testimony whereof I have hereunto set my hand.

FRANCIS L. CLARK.

Witnesses:
ETHEL GALLAGHER,
M. S. MURPHY.